(12) United States Patent
Steinich

(10) Patent No.: US 10,746,327 B2
(45) Date of Patent: Aug. 18, 2020

(54) SCREW CONNECTION

(71) Applicant: ASM Automation Sensorik Messtechnik GmbH, Moosinning (DE)

(72) Inventor: Klaus Manfred Steinich, Zorneding/Pöring (DE)

(73) Assignee: ASM Automation Sensorik Messtechnik GmbH, Moosinning (DE)

(*) Notice: Subject to any disclaimer, the term of this patent is extended or adjusted under 35 U.S.C. 154(b) by 131 days.

(21) Appl. No.: 15/492,897

(22) Filed: Apr. 20, 2017

(65) Prior Publication Data
US 2017/0314710 A1 Nov. 2, 2017

(30) Foreign Application Priority Data

Apr. 28, 2016 (DE) .................. 10 2016 107 880

(51) Int. Cl.
| | |
|---|---|
| *F16L 15/04* | (2006.01) |
| *F16L 15/00* | (2006.01) |
| *F16L 19/04* | (2006.01) |
| *H02G 15/04* | (2006.01) |

(52) U.S. Cl.
CPC ............ *F16L 15/04* (2013.01); *H02G 15/046* (2013.01); *F16L 15/007* (2013.01); *F16L 19/04* (2013.01)

(58) Field of Classification Search
CPC ......... F16L 15/04; F16L 15/00; F16L 15/008; F16L 17/02; F16L 25/021; F16L 47/16; F16L 15/002; F16L 15/007; F16L 58/182; F16L 19/0212; F16L 19/0218; F16L 19/04; E21B 17/0423; F16D 2125/405; F16K 31/506

USPC ...... 285/291.1, 291.2, 294.1, 355, 357, 369, 285/206

See application file for complete search history.

(56) References Cited

U.S. PATENT DOCUMENTS

| | | | | | |
|---|---|---|---|---|---|
| 3,695,642 | A | * | 10/1972 | DeWoody ................ | F16L 5/06 174/84 R |
| 4,296,950 | A | * | 10/1981 | Chamberlin .......... | F16L 58/184 285/342 |
| 4,485,654 | A | * | 12/1984 | Rasmussen ........... | F16L 27/087 279/2.09 |
| 4,603,889 | A | * | 8/1986 | Welsh ................... | F16B 31/028 285/148.19 |

(Continued)

FOREIGN PATENT DOCUMENTS

| | | |
|---|---|---|
| DE | 1114878 | 10/1958 |
| DE | 3436635 | 10/1984 |

(Continued)

*Primary Examiner* — Zachary T Dragicevich
*Assistant Examiner* — William S. Choi
(74) *Attorney, Agent, or Firm* — Head, Johnson, Kachigian & Wilkinson, PC

(57) ABSTRACT

In order to prevent gap corrosion at a freely accessible face of a threaded connection (1) in particular when used in sea water the threaded connection (1) is encapsulated in a circumferential tight annular chamber (3) in order to prevent a penetration of sea water to the threaded connection (1) and thus prevent the gap corrosion between the two threads (2, *b*) of the threaded connection (1) meshing with each other. This is achieved by a particularly pressure tight and long service life primary seal (6) and advantageously a supplemental secondary seal (16), in particular for a threaded connection (1) which seals a cable pass through (15) of a housing (22).

15 Claims, 5 Drawing Sheets

(56) References Cited

U.S. PATENT DOCUMENTS

| | | | | |
|---|---|---|---|---|
| 4,696,498 A * | 9/1987 | Church | E21B 17/0423 | 285/334 |
| 4,735,444 A * | 4/1988 | Skipper | F16L 15/008 | 285/288.1 |
| 4,834,139 A * | 5/1989 | Fitzgibbons | E21B 33/0355 | 137/614.04 |
| 4,907,828 A * | 3/1990 | Chang | E21B 47/011 | 285/184 |
| 4,988,127 A * | 1/1991 | Cartensen | E21B 17/042 | 285/334 |
| 5,068,496 A * | 11/1991 | Favalora | F16L 37/008 | 285/206 |
| 5,368,070 A * | 11/1994 | Bosley | F16L 17/02 | 137/614.04 |
| 5,505,502 A * | 4/1996 | Smith | E21B 17/085 | 285/334 |
| 6,478,344 B2 * | 11/2002 | Pallini, Jr. | E21B 17/042 | 285/333 |
| 6,811,189 B1 * | 11/2004 | DeLange | F16L 15/008 | 285/332.1 |
| 6,851,720 B2 * | 2/2005 | Hayashi | F16L 15/008 | 285/13 |
| 7,984,932 B2 * | 7/2011 | McGuire | F16L 19/00 | 285/354 |
| 8,297,663 B2 * | 10/2012 | Spears | F16L 15/02 | 285/355 |
| 8,454,058 B2 * | 6/2013 | Pechtold | F16L 19/0206 | 285/355 |
| 9,583,933 B1 * | 2/2017 | Campbell | H02G 15/04 | |
| 2003/0132632 A1 * | 7/2003 | Schoonen | F16L 15/008 | 285/333 |
| 2007/0252384 A1 * | 11/2007 | Dickerson | F16L 41/10 | 285/89 |
| 2008/0073911 A1 * | 3/2008 | Wells | F16L 15/008 | 285/369 |
| 2009/0025977 A1 * | 1/2009 | Anderson | H02G 3/0675 | 174/653 |
| 2010/0062628 A1 * | 3/2010 | Steele | H02G 15/04 | 439/190 |
| 2013/0181445 A1 * | 7/2013 | Glime | F16L 15/04 | 285/337 |
| 2015/0292653 A1 * | 10/2015 | Cody | F16L 15/04 | 285/351 |
| 2015/0345116 A1 * | 12/2015 | Chan | E03C 1/06 | 4/615 |

FOREIGN PATENT DOCUMENTS

| | | | | |
|---|---|---|---|---|
| DE | 10353002 | | 5/2005 | |
| DE | 202007003513 | | 6/2007 | |
| WO | WO-2016121626 A1 * | | 8/2016 | H05H 1/46 |

* cited by examiner

SCREW CONNECTION

I. FIELD OF THE INVENTION

The invention relates to a threaded connection that is typically used for a form locking connection of two components by threading them together.

II. BACKGROUND OF THE INVENTION

Thus the threaded connection is typically accessible from a face side, thus a face end of a contact surface that is provided between the meshing threads is reachable from the face side.

In particular in aggressive environments like sea water or brackish water there is a problem in that corrosion at contacting contact surfaces of two metal parts starts particularly quickly and progresses particularly quickly, much quicker than at exterior surfaces. This phenomenon is known as so called gap corrosion and starts in particular in threaded connections that are accessible from a face side initially in an environment of this type.

If this can be prevented a service life of the threaded connection and thus typically of the entire component at which the threaded connection is arranged is drastically increased for a connection which is accessible from a face side this is typically the place which has the lowest service life of the entire component in an environment of this type.

Threaded connections of this type are often required for screw caps and in particular for screw sleeves which require a face side pass through opening for a cable outlet in order to run a cable for example out of a housing when the housing includes for example a sensor or another electrical or an electronic assembly.

Additionally there is a problem in that the cable run through the pass through opening of the screw cap typically made from metal is typically less rigid than the metal components to be connected with each other and sealing the cable in the cable pass through relative to the metal components poses another difficulty.

III. DETAILED DESCRIPTION OF THE INVENTION a) Technical Object

Thus it is an object of the invention to provide an encapsulated threaded connection which even when the threaded connection is part of a cable pass through avoids gap corrosion in particular at the thread over a long time period so that a service life of the screw connection is greatly increased.

b) Solution

The object is achieved by the features of claim 1. Advantageous embodiments are derived from the dependent claims.

The gap corrosion between the two threads of the threaded connection meshing with each other is prevented in that the threads are received in an annular chamber that is sealed tight in an outward direction towards a typically aggressive environment so that chemical and physical parameters of the environment cannot attack the threaded connection.

This is achieved in that the walls of the annular chamber are at least partially formed by the two metal components of that are to be fixated relative to each other by the threaded connection wherein the threaded components are also annular but partially also by other components which are typically also annular wherein it is important to seal the adjacent walls of the chamber by at least one respective annular primary seal relative to each other, advantageously by a secondary seal.

Thus for the primary seal there are plural options which can cause long term tightness.

The first option is to arrange an annular elastic seal in the annular seal gap between the contact surfaces oriented against each other of the walls of the chamber that are adjacent to each other.

wherein the seal is either made from an elastic advantageously partially cure able and initially shapeless sealing material, or to arrange a shaped elastic seal element.

For a shaped stable seal element the pressure applied by the preload upon the seal element is at least one bar positive pressure, better at least two bar positive pressure for an increased ambient pressure at least one bar, better at least two bar positive pressure relative to the ambient pressure.

When an elastic seal of this type is arranged in the axial direction between the contact surfaces it is compressed over and over again with increasing tightening of the threaded connection and its sealing effect is increased so that do to the elasticity e.g. also for a temperature induced change of the width of the seal gap the tightness is maintained.

A second option is to press the two adjacent walls directly against each other in the axial direction, advantageously by the threaded connection to be protected but to cover the sealing gap thus the contact portion on an outside with a sealing compound covering the sealing gap wherein the sealing compound is also elastic.

Also here sufficient permanent elasticity of the sealing gap has the effect that even under temperature induced expansions of the adjacent walls and even under temperature induced slight opening of the seal gap between the components pressed against each other the externally applied elastic seal does not tear off from the outer surfaces of the two adjacent walls and does not release the excess to the seal gap.

For a primary seal externally covering the seal gap the seal length in absolute numbers is at least 6 mm, better at least 8 mm, better at least 10 mm and/or in relative numbers at least 2%, better at least 4%, better at least 5% of the outer diameter of the seal gap.

A third option is to weld the adjacent walls thus their contact surfaces together or to glue them together.

In particular a glue seam of this type also has to be sufficiently elastic in order to be able to permanently compensate a change of a width of the seal gap within certain limits. This also applies for a weld seam but it is typically provided.

The seal length of the primary seal arranged in an axial direction between the contact surfaces of the components to be sealed relative to each other in radial direction is at least 2 mm in absolute numbers, better at least 4 mm, better at least 8 mm and in relative numbers at least 2%, better at least 4%, better at least 5% of an outer diameter of the primary seal arranged in the axial seal gap.

A primary seal thus configured thus resists high ambient pressures, for example in a threaded connection that is arranged at a great depth in the ocean.

A primary seal thus configured provides a high level of long term tightness of the annular chamber and gap corrosion at this location is thus prevented.

Additional sealing safety can be provided by a secondary seal that is arranged further inward towards the chamber relative to the primary seal wherein the secondary seal is less complex and typically also less pressure tight. In spite of that the secondary seal can prevent a further penetration of small amounts of moisture which have overcome the primary seal, for example in the starting phase of the destruction of the primary seal for some time against penetration into the chamber and thus towards the threaded connection.

The secondary seal can thus be for example an elastic sealing compound or a form stable seal element, in particular an O-ring, which is not increasingly compressed by the threaded connection in the axial direction during threading but is only loaded with a limited, typically radial preload. A typical case is arranging an O-ring between two components that are concentrically arranged about one another and move able in relative to each other in the axial direction, for example the components that are to be threaded relative to each other.

Particularly high long term strength of the threaded connection is achieved in that the threaded components that are to be threaded together are connected with each other by plural threaded connections that are arranged in the axial direction behind each other, thus pairs of threads that are meshing with each other.

As long as the plural threaded connections are respectively arranged in a proprietary sealed annular chamber even upon damaging or destroying one of the threaded connections the additional threaded connection that has not been damaged or destroyed is able to maintain the overall threaded connection.

When the threaded connections is used for example to close a housing tight the housing only becomes non-tight when all of the threaded connections that are arranged axially behind one another are destroyed.

Out of the components that are to be threaded into each other typically one is a screw sleeve or a screw cap.

A particularly frequent case is providing a cable pass through, wherein the screw cap includes a face side pass through opening through the cable and is threaded against another component of the cable outlet in order to apply a sufficient pressing force upon a seal sleeve that is annular and provided between the outer circumference of the cable and the inner circumference of one of the components.

The seal sleeve is received in an annular cavity between two components that are thread able together, typically the components that are to be threaded together and is increasingly axially compressed with increased threading so that due to a volume of the annular cavity for the seal sleeve that is increasingly compressed in the axial direction, the seal sleeve is also pressed with increasing pressure radially against an outer circumference of the cable section on an inside and on an outside against the inner circumference of the component penetrated by the cable.

For this purpose the seal sleeve has to have a sufficient seal length in axial direction by which it is pressed with a radial preload onto an outer circumference of the cable section.

Advantageously the seal sleeve has a cross section which has flanks that are sloped downward from the radial outermost point in an axial forward and axial backward direction wherein the flanks are straight or cambered so that an axial deformation of the seal sleeve in a direction towards an inner circumference is enhanced.

C) EMBODIMENTS

Embodiments of the invention are subsequently described in more detail with drawing figures, wherein:

FIG. 1a, b illustrates a threaded connection according to the invention in an axial sectional view and in a cross sectional view;

FIG. 2a, b illustrates an electronic housing, in particular a sensor housing with a threaded connection according to the invention in an exploded view;

FIG. 2b illustrates the housing of FIG. 2a in an assembled condition in top view;

FIG. 3a, b illustrates the cable inlet into the housing of FIG. 2a, b with the threaded connection cut in an axial direction of the cable inlet in different blown up scales;

Figure 1A:
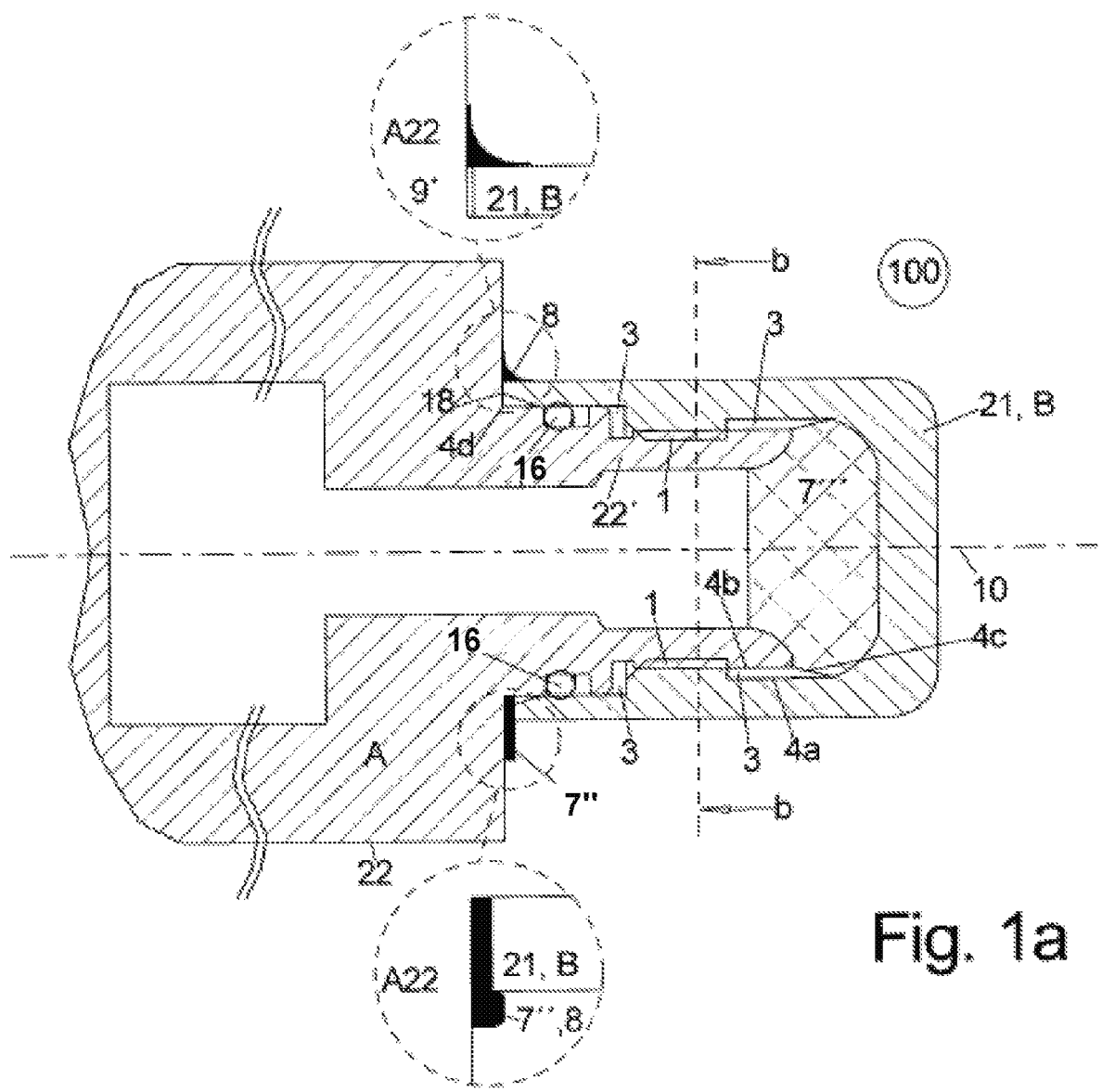

FIG. 1a illustrates the typical situation of 2 components A, B of a threaded connection 1 that are to be threaded together in this case of a housing 22 with an inner cavity configured as component A which includes a threaded spout 2' that protrudes in an outward direction, advantageously rotation symmetrical. This threaded spout 22' includes an inner pass through opening extending in an axial direction of the threaded spout 22', wherein the pass through opening establishes a connection from the interior space of the housing to the outer ambient 100 wherein the connection shall be close able using a screw cap 21 forming the component B that is, wherein the screw cap is threaded onto an outer circumference of the threaded spout 22' that shall be closeable tight.

When the outer ambient 100 about the housing 22 is made from an aggressive medium like sea water it is important for a long service life of the threaded connection and thus of the components typically electronic components arranged in the interior of the housing 22 that the medium of the ambient 100 cannot get to the threaded connection 1 even over long time periods and cannot cause any gap corrosion at this location wherein the gap corrosion can damage the threaded connection 1 over a short time period and can also destroy it completely.

For this purpose the typically annular threaded connection 1 is received in a chamber 3 that is also configured annular in a threaded condition of the two components A, B in an outward direction wherein the chamber 3 is in particular tight towards the ambient 100.

Figure 1B:
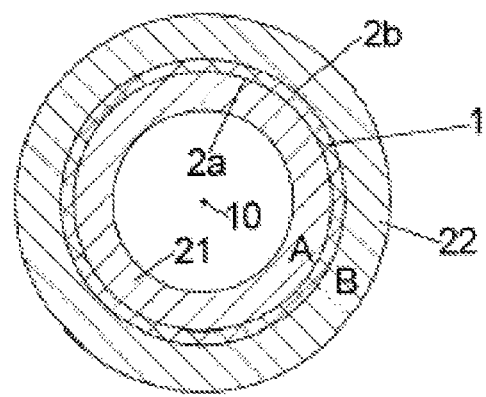

The annular, in particular rotation symmetrical configuration of the threaded connection 1 and at least in the portion of the threaded connection 1 of the components A, B threaded together, herein of the threaded spout 22' and of the screw cap 21 can be derived from the cross sectional representation of FIG. 1b, in particular the meshing threads 2a, b of the threaded connection 1.

The walls of the annular chamber 3 are partially formed by the components A, B, themselves partially by other components.

The radially inner circumferential surface of the chamber 3 is formed in this case by the outer surface of the threaded spout 22, the radially outer circumferential surface of the chamber 3 from the inner circumferential surface of the screw cap 21.

The right annular face surface in FIG. 1a is formed by one of the two primary seals 6 of the threaded connection 1 which is made in this case from a form stable seal element 7 made from elastic material, thus provided as a seal plug 7'''. The seal plug 7''' has an approximately conical or convex cambered cross section of an outer circumference and protrudes with a portion of its greatest diameter radially outward into the axial gap between the free face of the housing spout 22' and the base of the screw cap 21.

When tightening the threaded connection 1 the seal plug 7''' is compressed there between in the axial direction. Due to the conical cross section of the outer circumference and/or a corresponding conical inner circumference of the housing spout 22' at its free front end into which the sealing plug 7''' protrudes the sealing plug 7''' is compressed by axial force loading, not only in the axial direction, but also by the conical shaped of the inner circumference of the housing spout 22' as well as of the outer circumference of the seal plug 7''' also causes a radial compression.

Since advantageously also the transition from the base to the inner circumferential walls of the screw cap 21 is slanted towards the axial direction or rounded, also this bevel or round shape compresses the threaded plug 7''' in radial direction when threading the threaded cap 21 axially forward.

This way the seal plug 7''' made from elastic material is preloaded in the radial direction and also in the axial direction and maintains its sealing properties also e.g. under temperature induced size variations of the screw cap 21 as well as of the threaded spout 22' so that a face side ring wall 4c of the chamber 3 is reliably provided.

The other face side ring surface 4d of the chamber 3 is formed in that the free face of the dust cap 21 is directly or indirectly sealed against a radially extending outer surface of the housing 22 and this location has to be permanently sealed by a second primary seal 6 with increasing threading of the threaded connection 1, thus of the screw cap 21 against the housing 22, the screw cap 21 after the primary seal 6 configured as a sealing plug 7''' is already sufficiently preloaded and sized accordingly. Thus the radially extending outer surface of the housing 22 extends from a transition of the base of the housing spout 22' with respect to the radial direction of the screw connection 1 radially further outward.

For this function plural options are available.

As illustrated in FIG. 1a in the lower half the primary seal 6 can be configured as a seal ring 7' which is inserted between both surfaces before the dust cap 21 is threaded on and which is axially compressed further when the threaded connection 1 is tightened.

Instead of a form stable seal element 7 this can also be a curable or partially curable sealing compound 8 which is introduced into the seal gap 9 before the threaded cap 21 is screwed down.

This sealing compound 8 can also be a glue.

As evident from the upper half of the figure the screw cap 21 configured as component B can be moved with its face until it directly contacts the outer surface of the housing 2, the component A either contacting or with a small distance and then the two components A, B, thus the free face of the screw cap 21 can be welded with the outer surface of the housing 22. This certainly leads to a permanent closure of the housing 22 which cannot be open anymore without destroying the components.

If the option to open shall continue to exist which is preferred for a threaded connection since otherwise the threaded connection would also be redundant. The sealing gap 9 can be circumferentially sealed tight in a radially upward direction by a sealing compound 8 not matter whether in closed condition of the screw connection 1 the face of the screw cap 21 still is arranged at a distance from the housing 22 or contacts the housing 22.

It is appreciated that the sealing compound 8 has to resist the medium of the environment 100, e.g. salt water.

It is appreciated that by the same token that the tightness of an externally applied sealing compound 8 of this type is a function of the tightness of the adhesion of the sealing compound 8 of the components A, B which accordingly have to be brought into an optimum adhesion capable condition of their surfaces in this portion before applying the sealing compound in particular by degreasing, grinding or plasma beam treating or similar.

Between the one gasket, thus the left primary gasket 6 and the screw connection 1 additionally a supplemental second seal 16, e.g. the O-ring seal 13 illustrated herein can be arranged where the O-ring 13 is inserted into a seal groove machined into the circumferential surface which provides emergency sealing in case the adjacent primary seal 6 starts to leak.

Figure 2A:
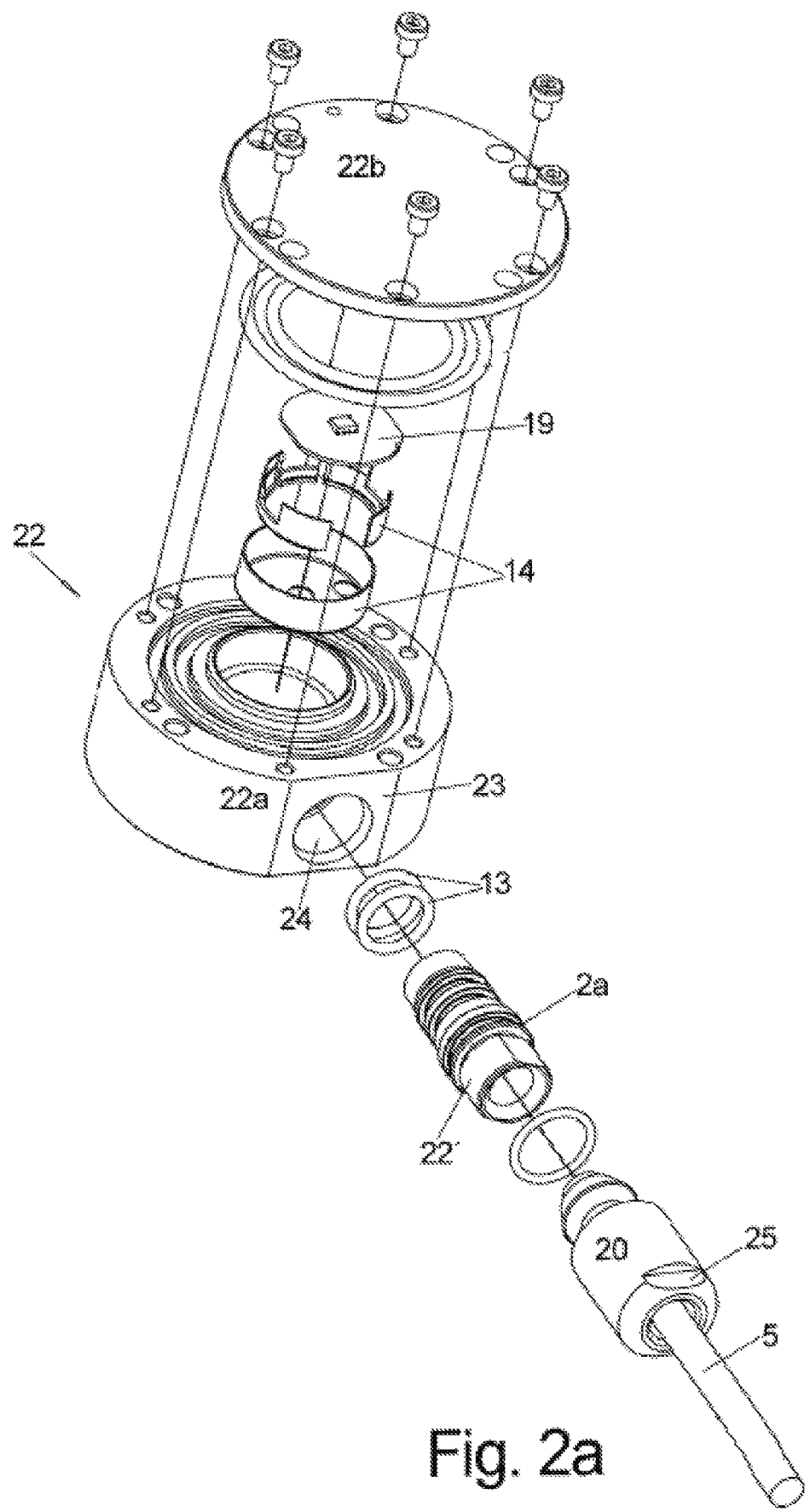

FIGS. 2a, b, 3a, b illustrate the application of the principle according to the invention upon a sensor housing as illustrated in FIG. 2a, in an exploded view, wherein an only indicated electronic circuit 19 which according to FIG. 2a is arranged in the interior of the housing 22 with plural support elements and a sensor and wherein the housing shall be completely sealed relative to the ambient in spite of a cable 5 run out of the sensor housing 22 and wherein the screw connection 1 that is used for sealing the cable outlet is configured as described supra.

Figure 2B:
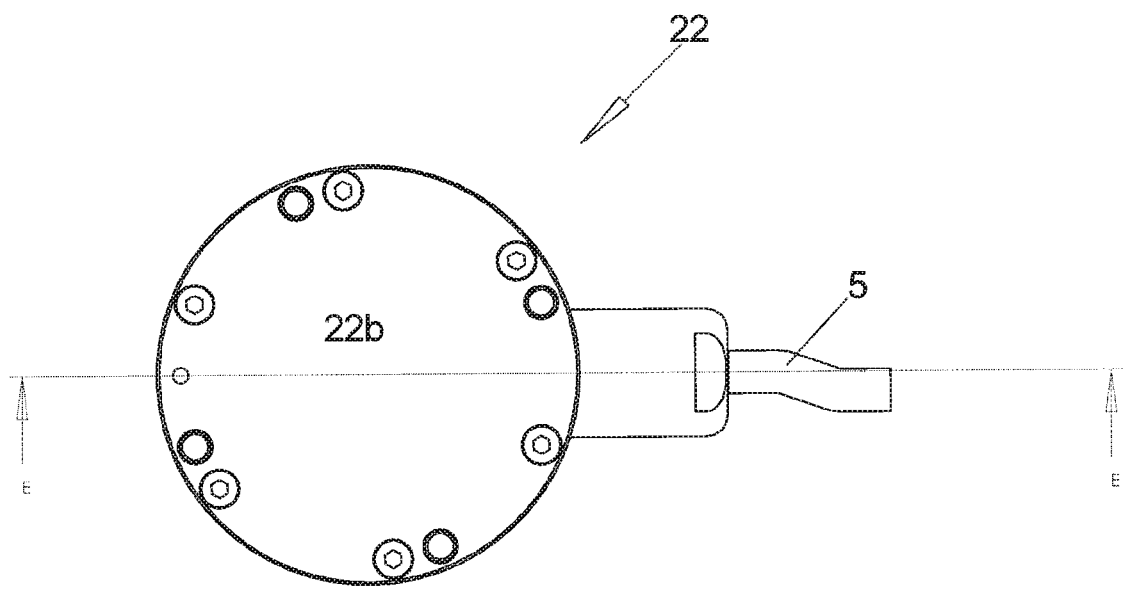
Figure 3A:
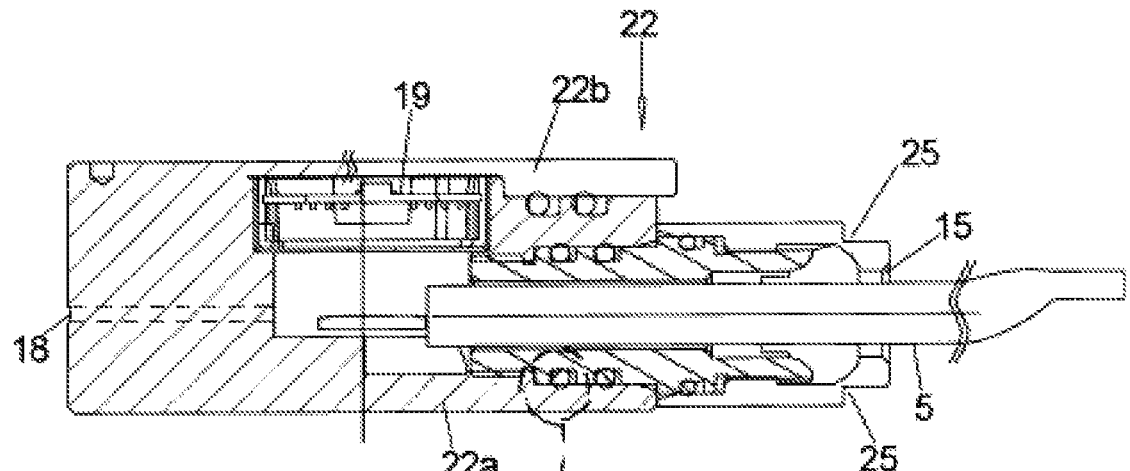
FIG. 3c illustrates another engineering application of the O-ring seal.

In this context the exploded view of FIG. 2a and the sectional view of FIG. 3a which axially extends through the cable pass through show that the housing 22 is made from a top shaped housing 22a and a cover 22b screw tight onto its open side as illustrated in particular in the top view of FIG. 2 in completely assembled condition, wherein the screwed on cover 22b is sealed relative to the pot shaped housing element 22a by two O-rings 13 that are arranged concentric with each other.

FIG. 3a, left half indicates that the housing can also be made from two half shells that are placed against each other with their open sides wherein the half shells are welded together by a weld 18 which can certainly only be done after the respective components are arranged in the housing, in particular the electronic circuit 19.

Since the sensor housing 22 however shall be open able again thereafter and thus not only at the cable pass through 15, but also for an access into the an interior of the housing 22 so that the electronics 19 arranged therein can be replaced or can be retrieved at least for test purposes primarily the variant illustrated in FIG. 3a on the right can be used, thus according to FIG. 2a together with a cable pass through 15 sealed by the threaded connection 1 according to the invention.

As illustrated in FIG. 2a the pot shaped housing component 22a has a circular outer circumference viewed from the open side wherein the circular outer circumference is flattened at one circumferential location and in the portion of this flat spot an pass through opening 24 is visible extending through the wall of the pot shaped housing element 22a into the interior through which the cable 5 can be run out by a threaded connection 1 as evident from the sectional view of FIG. 3a, b axially extending along the pass through opening 24.

On a one hand side it is visible that the housing spout 22' protruding outward in FIG. 1a which is integrally configured at this location together with the housing 22 in the solution of FIGS. 2a, b, 3a, b is a separate threaded sleeve 22" which is screwed into the pass through opening 24 of the housing 22 which certainly requires additional sealing between the housing 22 and the threaded sleeve 22".

This screw connection 1' also has to be sealed in outward direction which is done in this case with O-rings 13 arranged in the axial direction 10 of the pass through opening 24 and thus of the threaded sleeve 22 behind one another in an outer circumference of the threaded sleeve 22" which are radially compressed when inserting and threading the threaded sleeve 22" into the pass through opening 24 of the housing 22.

Thus, the threaded connection 1, according to the invention in analogy to the solution of FIG. 1a is thus provided between the outer circumference of the threaded sleeve 22" as a component A and the component B threaded onto its outer circumference, the latter is thus provided as a threaded sleeve 20 with an axial pass through opening 15a for the cable 5 to be inserted instead of a face closed screw cap 21 as visible in FIG. 1a and a wrench contact surface 25 for applying an open end wrench at the threaded sleeve 20 as evident from FIG. 2a.

Sealing the cable pass through relative to the ambient 100 is provided in that the primary seal 6 configured as a seal element is not provided or not configured as a seal sleeve 7' through whose axial pass through opening the cable 5 can be run when the seal sleeve 7 is not loaded.

However as soon as the seal sleeve 7 is axially compressed between the free face of the component A, thus the threaded sleeve 20' and the component B of the threaded sleeve 20. The seal sleeve 7' with its inner circumference based on the configuration of the seal element described in FIG. 1a presses on one side and of the components A, B on the other side in an entire circumference radially inward against the outer circumference of the cable 5 and seals relative thereto.

For the primary seal 6 at the other end, thus the left end in FIG. 3a, b of the annular chamber 3 there are the same options as described based on FIG. 1a, but not all the variants are drawn in FIG. 3a, b.

Figure 3C:
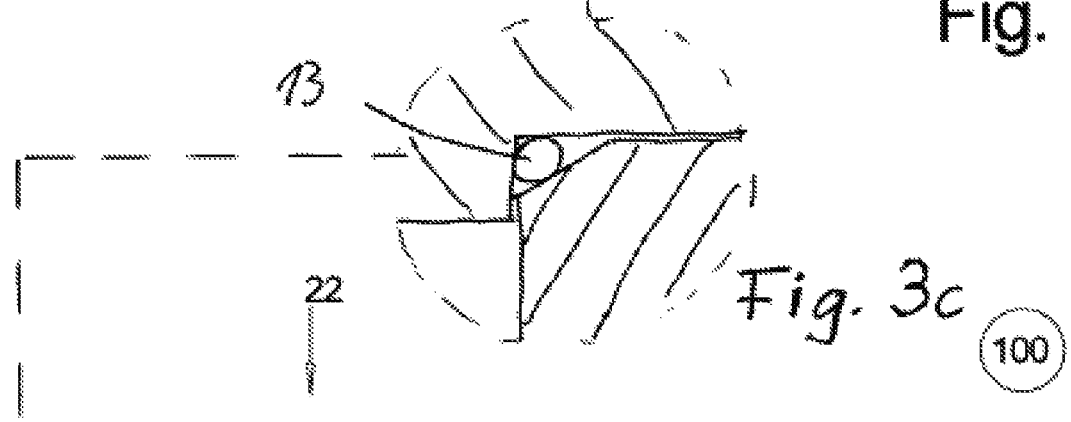
Figure 3B:
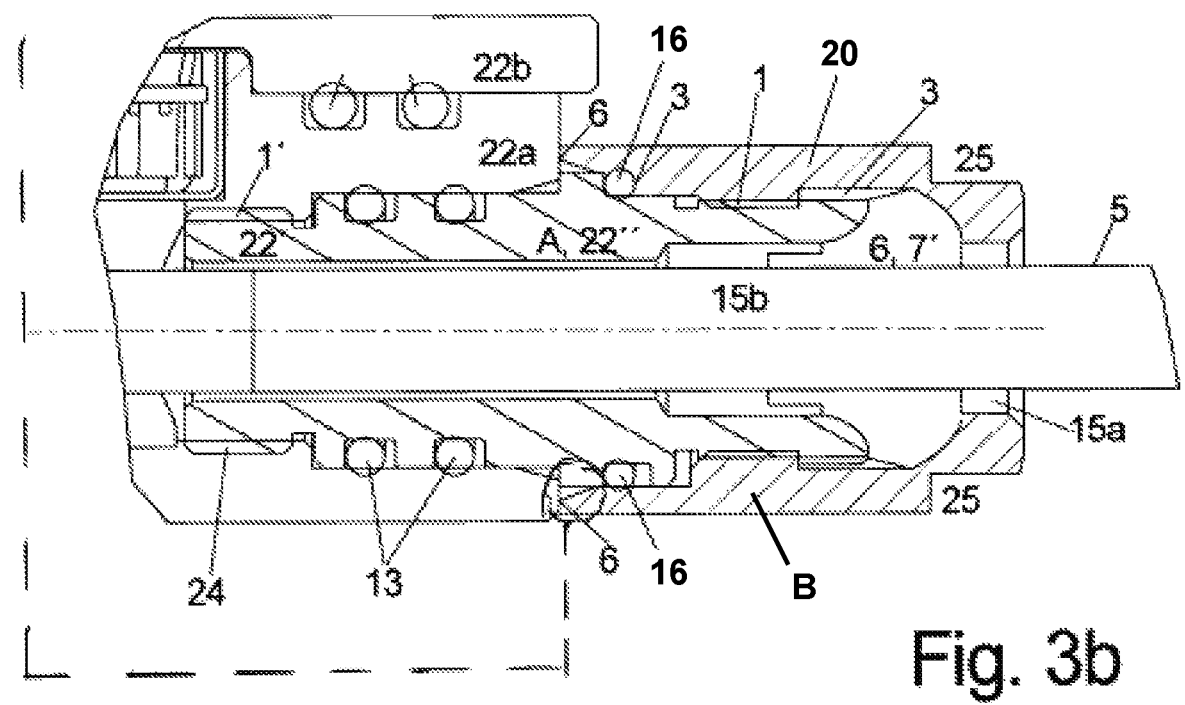

FIG. 3b in the upper half shows that in analogy to sealing the right face ring surface of the chamber 3 the O-ring 13 is pressed also in the axial direction between a shoulder of the component B and an opposite shoulder of the component A when tightening the threads 2a, b on the thread paths 2a, b.

This however requires a good sizing of another primary seal 6, in particular relative to the first primary seal 6 axially compressed due to the same threaded connection at a right end of the chamber 3. In the embodiment of FIG. 3b, top two axially offset primary seals 6 are used on one of the two sides of the thread 22a, b of the threaded connection 1, which thread is to be protected and this can also be performed on both sides in the axial direction of the engaging threads 22a, b of the threaded connection 1.

According to FIG. 3c it is an alternative to arranged the O-ring between an annular circumferential shoulder which forms an inner corner in the longitudinal sectional view of the first component and a annular circumferential edge of the second component which forms an outer edge in the longitudinal sectional view, which however is beveled, thus in the annular free space with triangular cross section between the two components.

This minimizes cross sectional variation of the O-ring 13 during compression and increases its service life.

Figure 4:
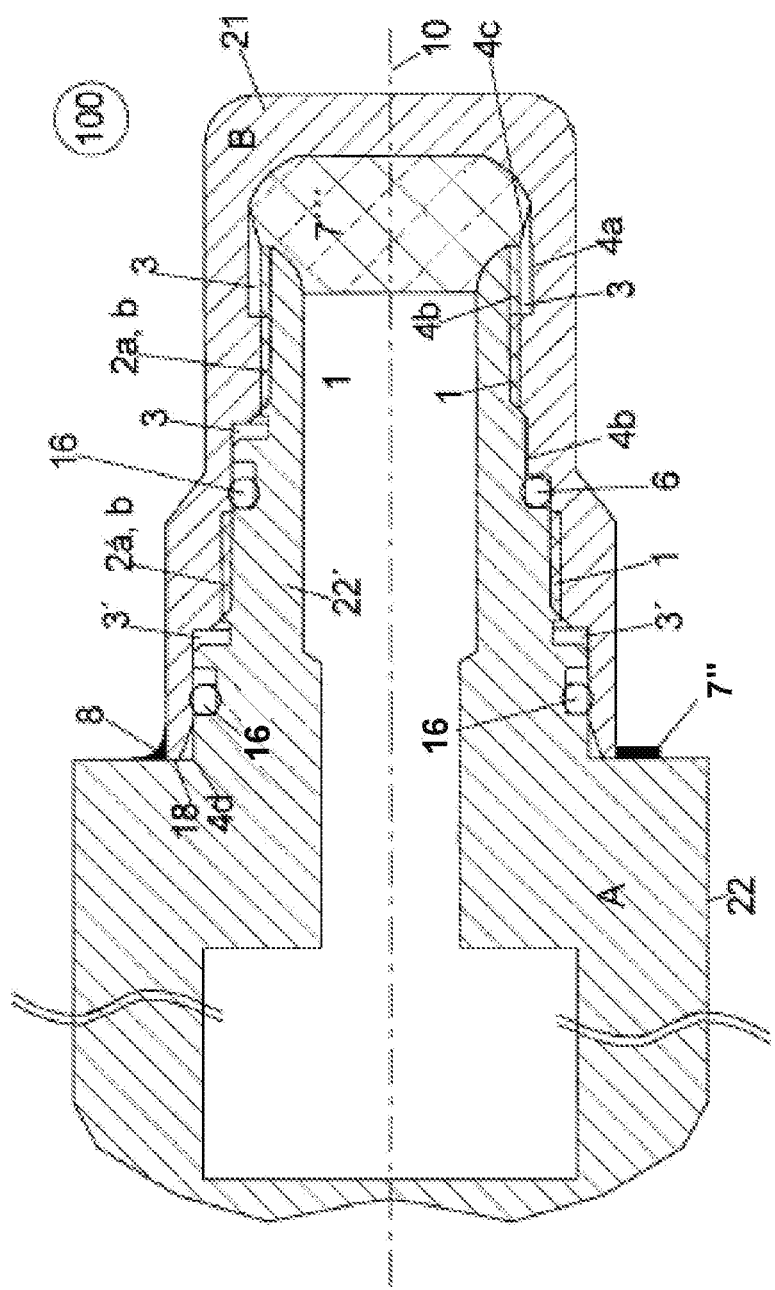
FIG. 4 illustrates a threaded connection according to the invention with two threads arranged in axial sequence in an axial sectional view.

FIG. 4 illustrates another solution how the risk of the threaded connection not being tight and thus the risk of destroying the threaded connection 1 can be minimized.

This solution is illustrated based on the threaded cap 20, thus a threaded sleeve with a closed face in analogy to FIG. 1a however can also be used in the same way for a threaded sleeve 21 and thus for a cable pass through or for any other threaded connection.

As evident from FIG. 4 two meshing threaded pairs 2a, b, 2' a, b are arranged axially behind each other in the axial direction 10 wherein the threaded pairs respectively connect identical components A, B with one another in that two respective threads 2a, 2'a, 2b, 2'b are arranged behind one another at each of the components A, B.

Each thread pair 2a, b, 2'a, b is arranged in a separate tight chamber 3, 3' in assembled condition which is also sealed relative to the other chamber so that in case one of the chambers 3, 3' is not tight and thus the threads 2a, b or 2'a, b the other chamber 3', 3 is still tight and the thread 2'a, b or 2a, b is not in contact with the ambient and can still perform its function.

As apparent the chambers 3, 3' are also arranged axially offset from each other and between them there is
- at least one secondary seal 16 configured as a radially compressed O-ring seal as illustrated in the upper half of FIG. 4,
- Advantageously however also a primary seal 6 configured e.g. as an axially compressed O-ring seal as illustrated in the lower half of FIG. 4.

Thus, each of the chambers 3, 3' on both sides of the respective screw connection 1 can include a secondary seal 16 or an additional primary seal 6 between the primary seal 6 and the screw connection 1.

Thus, the optimum safety will be provided in that the two chambers 3, 3' between each other include at least two primary seals 6 and are sealed on their side that is axially oriented away from the other chamber 3', 3 are sealed on their face side by respectively not only one but two primary seals 6.

REFERENCE NUMERALS AND DESIGNATIONS 1 threaded connection
2a, b thread
3, 3' chamber
4a, b, c wall
5 cable
5' cable section
6 primary seal
7 seal element
7' seal sleeve
7" seal ring
7'" seal plug
8 sealing compound
9 sealing gap
10 axial direction
11 first transversal direction
12 second transversal direction
13 O-ring sleeve
14 support element
15 cable pass through
15a, b pass through opening
16 secondary seal
17 open wrench contact surface
18 weld seam
19 electronic circuit
20 threaded sleeve
21 screw cap
22 housing
22a, pot shaped housing element
22b cover 22' housing spout
22" threaded sleeve
23 flat surface
24 pass through opening
25 wrench contact surface
100 ambient, sea water
A, B component

The invention claimed is:

1. An encapsulated threaded connection (1), comprising:
at least two annular components (A, B) to be threaded into each other,
wherein a respective thread of two threads (2a, b) of the threaded connection (1) is respectively arranged at each of the components,
characterized in that
the threads (2a, b) are received in an annular empty chamber (3) that is sealed tight in an outward direction towards the ambient (100) and that extends on both sides of the threads (2a, b) in an axial direction,
the walls (4a-d) of the chamber (3) are at least partially formed by the components (A, B), and
the adjacent walls (4a, b) of the chamber (3) formed by the components (A, B) are sealed relative to each other on both sides of the threads in axial direction by at least one respective annular primary seal (6) so that the threaded connection comprises at least two of said primary seals, and
wherein the primary seals (6) are made from elastic seal material or from sealing compound (8), wherein further
at least one of the two primary seals (6) is arranged spaced apart from the chamber (3) and spaced apart from the threads as an axially compressed primary seal (6) and is arranged along the axial direction between a contact surface of one of the components (A, B) and a contact surface of the other component (A, B) so that along the axial direction there is one after another said contact surface of the one of the components (A, B) followed by said one of the two primary seals (6) followed by said contact surface of the other component (A, B), wherein the contact surfaces of the components (A, B) are spaced apart from the chamber (3); or
at least one of the two primary seals (6) is arranged spaced apart from the chamber (3) and spaced apart from the threads as an ambient primary seal and covers a seal gap (9) between two contact surfaces of the components (A, B) so that the at least one of the two primary seals (6) is in contact with the seal gap (9) and the ambient (100), wherein the contact surfaces of the components (A, B) are spaced apart from the chamber (3),
the adjacent walls (4a, b) formed by the components (A, B) are sealed relative to each other in addition to the two primary seals (6) by an annular secondary seal (16), made from an elastic seal material and spaced apart from the chamber (3); and
the secondary seal (16) is made from an elastic seal material, wherein the threaded connection (1) comprises a seal groove in one of the components (A, B) spaced apart from the chamber (3) and spaced apart from the threads and having an axial extension larger than an axial extension of the secondary seal (16), which is arranged in the seal groove of said one of the components (A, B) and is arranged along the axial direction only between two surfaces of the seal groove of said one of the components (A, B), so that the secondary seal (16) is pressure loaded only in one or only in all transversal directions (11, 12) due to not contacting one of the two surfaces of the seal groove of said one of the components (A, B) between which the secondary seal (16) is arranged in the axial direction when the threaded connection (1) is closed.

2. The threaded connection (1) according to claim 1, characterized in that the secondary seal (16) is made from a radial circumferential O-ring seal (13) which is spaced apart from the chamber (3) and spaced apart from the threads and is arranged between the two components (A, B) that are movable relative to each other and wherein the secondary seal is only compressed radially by being in a seal groove of one of the components (A, B) with an axial extension larger than an axial extension of the O-ring seal (13), so that the O-ring seal (13) does not contact at least one surface of the seal groove and is along the axial direction only between two surfaces of the seal groove.

3. The threaded connection (1) according to claim 1, characterized in that one of the components (A) is a threaded sleeve (20), having a screw cap (21), wherein one of the two primary seals (6) is a seal plug (7''') arranged between a face of the other component (B) and a base of the screw cap (21) and compressed at least axially there between when the threaded connection (1) is closed, so that along the axial direction there is one after another said base of the screw cap followed by said one of the two primary seals (6) being a seal plug followed by said face of the other component (B) and so that the seal plug forms a wall of the chamber (3) and is not spaced apart from the chamber (3) but spaced apart from the threads.

4. The threaded connection (1) according to claim 1, characterized in that the threaded connection (1) includes a cable pass through (15) and a cable section (5') of a cable (5) that is run through the cable pass through (15) is sealed relative to one of the walls (4a-d) of the chamber (3), wherein one of the two primary seals (6) is in contact with an outside of the cable (5) and also forms a wall of the chamber (3) and also is not spaced apart from the chamber (3) but spaced apart from the threads.

5. The threaded connection (1) according to claim 4, characterized in that the cable pass through (15) includes two pass through openings (15a, b) for the cable (5) that are aligned with each other in the axial direction, wherein at least one pass through opening is arranged in a wall (4a, b) defining the chamber (3), of which the primary seal (6) contacting the outside of the cable (5) forms a wall of the chamber.

6. The threaded connection (1) according to claim 1, characterized in that one respective wall of the walls (4c, d) of the empty chamber (3) is formed by one of the two primary seals (6), so that this wall of the chamber (3) is not formed by the components (A, B).

7. The threaded connection (1) according to claim 6, characterized in that the primary seal (6) forming one of the respective walls (4c, d) is a seal element (7), wherein the seal element (7) is a seal sleeve (7') in which a pass through opening (15a) for a cable (5) is arranged for contacting an outside of the cable (5).

8. The threaded connection (1) according to claim 7, characterized in that the seal sleeve (7') has a cross section whose outer contour tapers cone shaped in at least one of the axial directions (10) towards a face end, and one of the components (A, B) has a contact surface for the seal sleeve (7') which is accordingly configured cone shaped, wherein the seal sleeve (7') is compressed at least axially between the contact surface and a face of the other component (A, B) not comprising the contact surface when the threaded connection (1) is closed.

9. The threaded connection (1) according to claim 1, characterized in that the threaded connection comprises at least three of said primary seals of which one primary seal (6), which is an axially compressed primary seal and is arranged along the axial direction between a contact surface of one of the components (A, B) and a contact surface of the other component (A, B) so that along the axial direction there is one after another said contact surface of the one of the components (A, B) followed by said one of the two primary seals (6) followed by said contact surface of the other component (A, B), wherein the contact surfaces of the components (A, B) are spaced apart from the chamber (3) and spaced apart from the threads, is arranged between the threads and the primary seal (6) on a face side of the threaded connection (1) respectively being the axially compressed seal or being the ambient primary seal so that on one side of the threads there are at least two primary seals (6), wherein the additional primary seal (6), respectively either both being the axially compressed primary seals or one of them being the ambient primary seal and the other being the axially compressed primary seal, is compressed at least axially when the threaded connection (1) is closed.

10. The threaded connection (1) according to claim 1, characterized in that the threaded connection (1) is made from plural pairs of meshing threads (2a, b, 2'a, b) arranged behind one another in the axial direction (10) and arranged in separate empty chambers (3, 3'), of which one is the annular chamber (3) and which both extend on both sides of their respective threads in an axial direction and which both are sealed tight in an outward direction towards the ambient (100) and which both are spaced apart from one another and which both have no overlap with each other.

11. The threaded connection (1) according to claim 10, characterized in that the threaded connection (1) comprises in addition to the two primary seals (6) an additional primary seal (6) which is an axially compressed primary seal and is arranged along the axial direction between a contact surface of one of the components (A, B) and a contact surface of the other component (A, B) so that along the axial direction there is one after another said contact surface of the one of the components (A, B) followed by said one of the two primary seals (6) followed by said contact surface of the other component (A, B), wherein the contact surfaces of the components (A, B) are spaced apart from both chambers (3) and from the threads, wherein the separate chambers (3, 3") are sealed relative to each other by the additional primary seal (6) compressed at least axially when the threaded connection (1) is closed, wherein the additional primary seal (6) is arranged between the separate chambers (3, 3") and spaced apart from both chambers (3,3") and from the threads.

12. The threaded connection (1) according to claim 10, characterized in that the threaded connection (1) comprises in addition to the two primary seals (6) a secondary seal (16), wherein the threaded connection (1) comprises a seal groove in one of the components (A, B) spaced apart from both chambers (3) and the threads and having an axial extension larger than an axial extension of the secondary seal (16), which is arranged in the seal groove of said one of the components (A, B) and is arranged along the axial direction only between two surfaces of the seal groove of said one of the components (A, B), so that secondary seal (16) is pressure loaded only in one or only in all transversal directions (11, 12) due to not contacting one of the two surfaces of the seal groove of said one of the components (A, B) between which the secondary seal (16) is arranged in the axial direction when the threaded connection (1) is closed, wherein the separate chambers (3, 3") are sealed relative to each other by the secondary seal (16) compressed only radially when the threaded connection (1) is closed, wherein the secondary seal (16) is arranged between the separate chambers (3, 3") and spaced apart from both chambers (3, 3") and the threads.

13. An encapsulated threaded connection (1), comprising:
at least two annular components (A, B) threaded into each other,
wherein a respective thread of two threads (2a, b) of the threaded connection (1) is respectively arranged at each of the components,
characterized in that
the threads (2a, b) are received in an annular empty chamber (3) sealed tight in an outward direction towards the ambient (100) and that extends on both sides of the threads in an axial direction,
the walls (4a-d) of the chamber (3) at least partially formed by the components (A, B), and
the adjacent walls (4a, b) of the chamber (3) formed by the components (A, B) are sealed relative to each other on both sides of the threads in axial direction by at least one respective annular primary seal (6) so that the threaded connection comprises at least two of said primary seals, and
wherein the primary seals (6) are made from elastic seal material and/or from sealing compound (8),
wherein further
at least one of the two primary seals (6) is arranged spaced apart from the chamber (3) and spaced apart from the threads as an axially compressed primary seal (6) and is arranged along the axial direction between a contact surface of one of the components (A, B) and a contact surface of the other component (A, B) so that along the axial direction there is one after another said contact surface of the one of the components (A, B) followed by said one of the two primary seals (6) followed by said contact surface of the other component (A, B), wherein the contact surfaces of the components (A, B) are spaced apart from the chamber (3); or
at least one of the two primary seals (6) is arranged spaced apart from the chamber (3) and spaced apart from the threads as an ambient primary seal and covers a seal gap (9) between two contact surfaces of the components (A, B) so that the at least one of the two primary seals (6) is in contact with the seal gap (9) and the ambient (100), wherein the contact surfaces of the components (A, B) are spaced apart from the chamber (3),
wherein further
one of the components (A) is a threaded sleeve (20), having a screw cap (21), wherein one of the two primary seals (6) is a seal plug (7''') arranged between a face of the other component (B) and a base of the screw cap (21) and compressed at least axially there between when the threaded connection (1) is closed, so that along the axial direction there is one after another said base of the screw cap followed by said one of the two primary seals (6) being a seal plug followed by said face of the other component (B) and so that the seal plug forms a wall of the chamber (3) and is not spaced apart from the chamber (3) but spaced apart from the threads.

14. An encapsulated threaded connection (1), comprising:
at least two annular components (A, B) threaded into each other, wherein a respective thread of two threads (2a, b) of the threaded connection (1) is respectively arranged at each of the components, characterized in that the threads (2a, b) are received in an annular empty chamber (3) that is sealed tight in an outward direction towards the ambient (100) and that extends on both sides of the threads in an axial direction, the walls (4a-d) of the chamber (3) are at least partially formed by the components (A, B), and the adjacent walls (4a, b) of the chamber (3) formed by the components (A, B) are sealed relative to each other on both sides of the threads in axial direction by at least one respective annular primary seal (6) so that the threaded connection comprises at least two of said primary seals, and wherein the primary seals (6) are made from elastic seal material and/or from sealing compound (8), wherein further at least one of the two primary seals (6) is arranged spaced apart from the chamber (3) and spaced apart from the threads as an axially compressed primary seal (6) and is arranged along the axial direction between a contact surface of one of the components (A, B) and a contact surface of the other component (A, B) so that along the axial direction there is one after another said contact surface of the one of the components (A, B) followed by said one of the two primary seals (6) followed by said contact surface of the other component (A, B), wherein the contact surfaces of the components (A, B) are spaced apart from the chamber (3); or at least one of the two primary seals (6) is arranged spaced apart from the chamber (3) and spaced apart from the threads as an ambient primary seal and covers a seal gap (9) between two contact surfaces of the components (A, B) so that the at least one of the two primary seals (6) is in contact with the seal gap (9) and the ambient (100), wherein the contact surfaces of the components (A, B) are spaced apart from the chamber (3), wherein further the threaded connection (1) includes a cable pass through (15) and a cable section (5') of a cable (5) that is run through the cable pass through (15) is sealed relative to one of the walls (4a-d) of the chamber (3), wherein one of the two primary seals (6) is in contact with an outside of the cable (5) and also forms a wall of the chamber (3) and also is not spaced apart from the chamber (3) but spaced apart from the threads.

15. An encapsulated threaded connection (1), comprising:
at least two annular components (A, B) threaded into each other, wherein a respective thread of two threads (2a, b) of the threaded connection (1) is respectively arranged at each of the components, characterized in that the threads (2a, b) are received in an annular empty chamber (3) that is sealed tight in an outward direction towards the ambient (100) and that extends on both sides of the threads in an axial direction, the walls (4a-d) of the chamber (3) are at least partially formed by the components (A, B), and the adjacent walls (4a, b) of the chamber (3) formed by the components (A, B) are sealed relative to each other on both sides of the threads in axial direction by at least one respective annular primary seal (6) so that the threaded connection comprises at least two of said primary seals, and wherein the primary seals (6) are made from elastic seal material and/or from sealing compound (8), wherein further at least one of the two primary seals (6) is arranged spaced apart from the chamber (3) and spaced apart from the threads as an axially compressed primary seal (6) and is arranged along the axial direction between a contact surface of one of the components (A, B) and a contact surface of the other component (A, B) so that along the axial direction there is one after another said contact surface of the one of the components (A, B) followed by said one of the two primary seals (6) followed by said contact surface of the other component (A, B), wherein the contact surfaces of the components (A, B) are spaced apart from the chamber (3); or at least one of the two primary seals (6) is arranged spaced apart from the chamber (3) and spaced apart from the threads as an ambient primary seal and covers a seal gap (9) between two contact surfaces of the components (A, B) so that the at least one of the two primary seals (6) is in contact with the seal gap (9) and the ambient (100), wherein the contact surfaces of the components (A, B) are spaced apart from the chamber (3), wherein further the threaded connection (1) is made from plural pairs of meshing threads (2a, b, 2'a, b) arranged behind one another in the axial direction (10) and arranged in separate empty chambers (3, 3'), of which one is the annular chamber (3) and which both extend on both sides of their respective threads in an axial direction and which both are sealed tight in an outward direction towards the ambient (100) and which both are spaced apart from one another and which both have no overlap with each other.

* * * * *